(12) United States Patent
Yang et al.

(10) Patent No.: US 8,023,265 B2
(45) Date of Patent: Sep. 20, 2011

(54) HEAT DISSIPATION DEVICE AND CENTRIFUGAL FAN THEREOF

(75) Inventors: Jian Yang, Shenzhen (CN); Jing Zhang, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 321 days.

(21) Appl. No.: 12/494,340

(22) Filed: Jun. 30, 2009

(65) Prior Publication Data

US 2010/0230076 A1    Sep. 16, 2010

(30) Foreign Application Priority Data

Mar. 13, 2009   (CN) .......................... 2009 1 0300870

(51) Int. Cl.
*H05K 7/20* (2006.01)

(52) U.S. Cl. ...... 361/700; 361/695; 174/15.2; 174/16.1; 165/104.33; 165/104.21; 415/213.1

(58) Field of Classification Search .................. None
See application file for complete search history.

(56) References Cited

U.S. PATENT DOCUMENTS

| | | | | |
|---|---|---|---|---|
| 6,643,129 B2 * | 11/2003 | Fujiwara | .................. | 361/679.47 |
| 6,778,390 B2 * | 8/2004 | Michael | ......................... | 361/695 |
| 6,847,524 B2 * | 1/2005 | Tomioka et al. | ............... | 361/695 |
| 7,325,590 B2 * | 2/2008 | Kim et al. | ................. | 165/104.33 |
| 2010/0025022 A1 * | 2/2010 | Tien et al. | ...................... | 165/121 |
| 2010/0071875 A1 * | 3/2010 | Hwang et al. | ................ | 165/80.3 |

* cited by examiner

*Primary Examiner* — Boris Chervinsky
(74) *Attorney, Agent, or Firm* — Altis Law Group, Inc.

(57) ABSTRACT

A centrifugal fan includes a plurality of blades, a housing for receiving the blades therein and an air guiding mechanism. The housing includes a top wall and a sidewall around the top wall. The sidewall defines a first air outlet and a second air outlet adjacent and perpendicular to the first air outlet. The air guiding mechanism is located between the first air outlet and the second air outlet. The air guiding mechanism includes an air guiding wall parallel to the second air outlet and an air partition wall extending inwardly from the air guiding wall towards the blades. The first air outlet is defined between the air partition wall and the sidewall. The second air outlet is defined between the air guiding wall and the sidewall of the housing.

13 Claims, 4 Drawing Sheets

HEAT DISSIPATION DEVICE AND CENTRIFUGAL FAN THEREOF

BACKGROUND

1. Technical Field

The disclosure relates to a centrifugal fan, and more particularly to a heat dissipation device incorporating the centrifugal fan for dissipating heat generated by electronic components of an electronic device.

2. Description of Related Art

With the fast development of the electronics industry, advanced electronic components such as CPUs (central processing units), or GPUs (graphics processing units) are being made with ever faster operating speeds. During operation of the advanced electronic components, a large amount of heat is generated. Greater emphasis is now being laid on increasing the efficiency and effectiveness of heat dissipation devices so as to keep operational temperature of the advanced electronic components within a suitable range.

Since most of the electronic devices, such as laptop computers do not have enough space therein for containing multiple heat dissipation devices, a heat dissipation device including one fin unit and one centrifugal fan is generally used for dissipating heat generated by multiple heat-generating electronic components of the laptop computer simultaneously, such as the CPU and the GPU. Generally, the CPU and the GPU are both thermally contacted with the fin unit, and the centrifugal fan having one air outlet for providing a forced airflow towards the fin unit to take heat therefrom.

However, the operating speeds of the two electronic components are generally different from each other, and therefore the amounts of heat generated by the two electronic components are also different. The CPU may generate much more heat than the GPU within a certain identical period. If the heat of the CPU transferred to the fin unit is not effectively and timely dissipated, a portion of heat of the CPU that is not timely dissipated may be transferred back to the GPU which has a lower temperature, thus inducing heat transfer between the two electronic components, since both of them are thermally connected to the fin unit.

It is thus desirable to provide a heat dissipation device which can overcome the described limitations.

DETAILED DESCRIPTION

Figure 1:
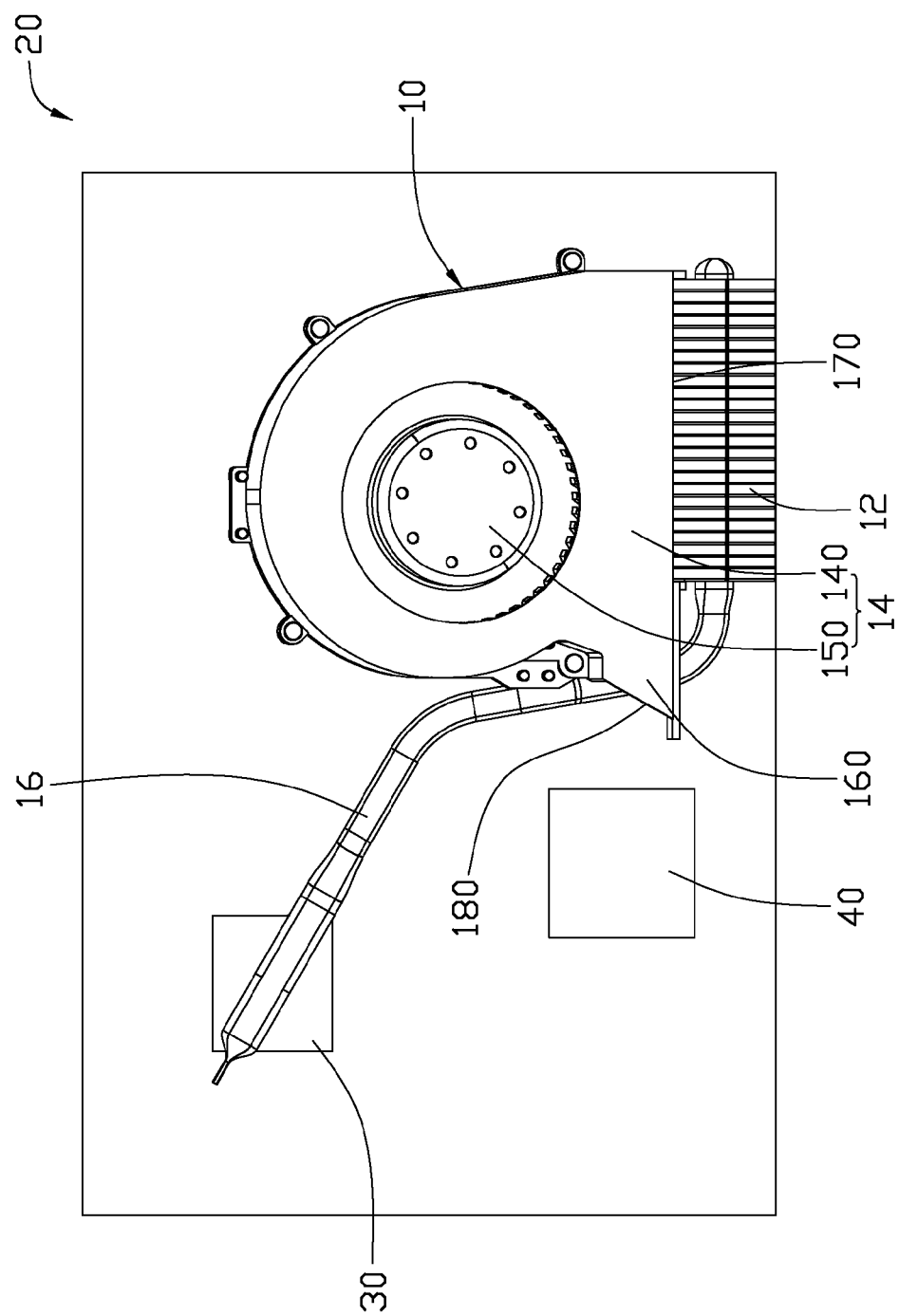
FIG. 1 is a schematic, assembled view of an electronic device with a heat dissipation device mounted therein in accordance with an exemplary embodiment.

Reference will now be made to the drawing figures to describe the present heat dissipation device in detail.

Referring to FIG. 1, a heat dissipation device 10 in accordance with an exemplary embodiment of the disclosure is shown. The heat dissipation device 10 is received in an electronic device 20 for dissipating heat from a primary electronic component 30 such as a CPU (central processing unit) and a secondary electronic component 40 such as a GPU (graphics processing unit) simultaneously, which are arranged on a printed circuit board (not shown) of the electronic device 20. The heat dissipation device 10 includes a fin unit 12, a centrifugal fan 14 and a heat pipe 16.

Figure 2:
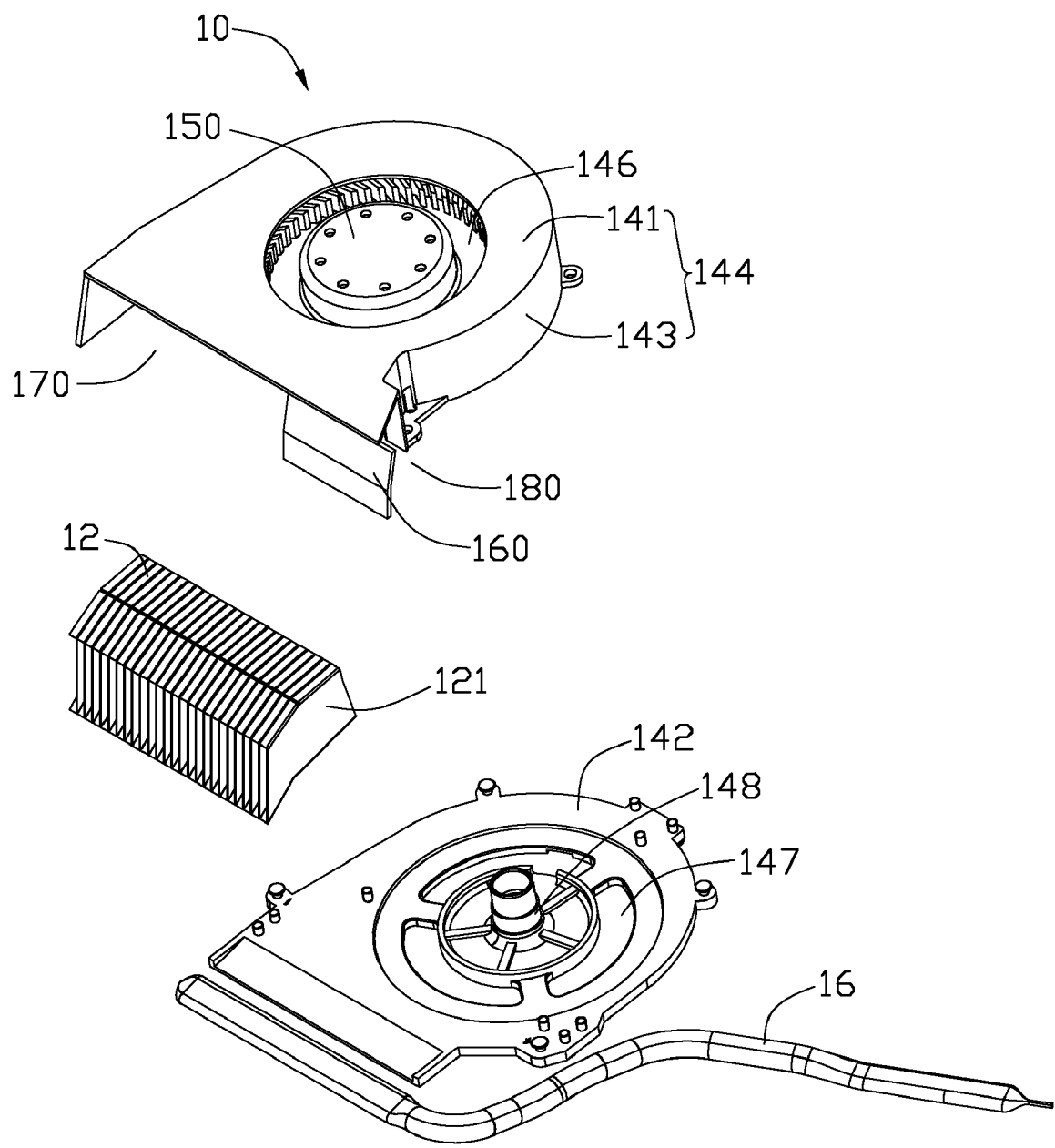
FIG. 2 is an isometric, exploded view of the heat dissipation device of FIG. 1.
Figure 3:
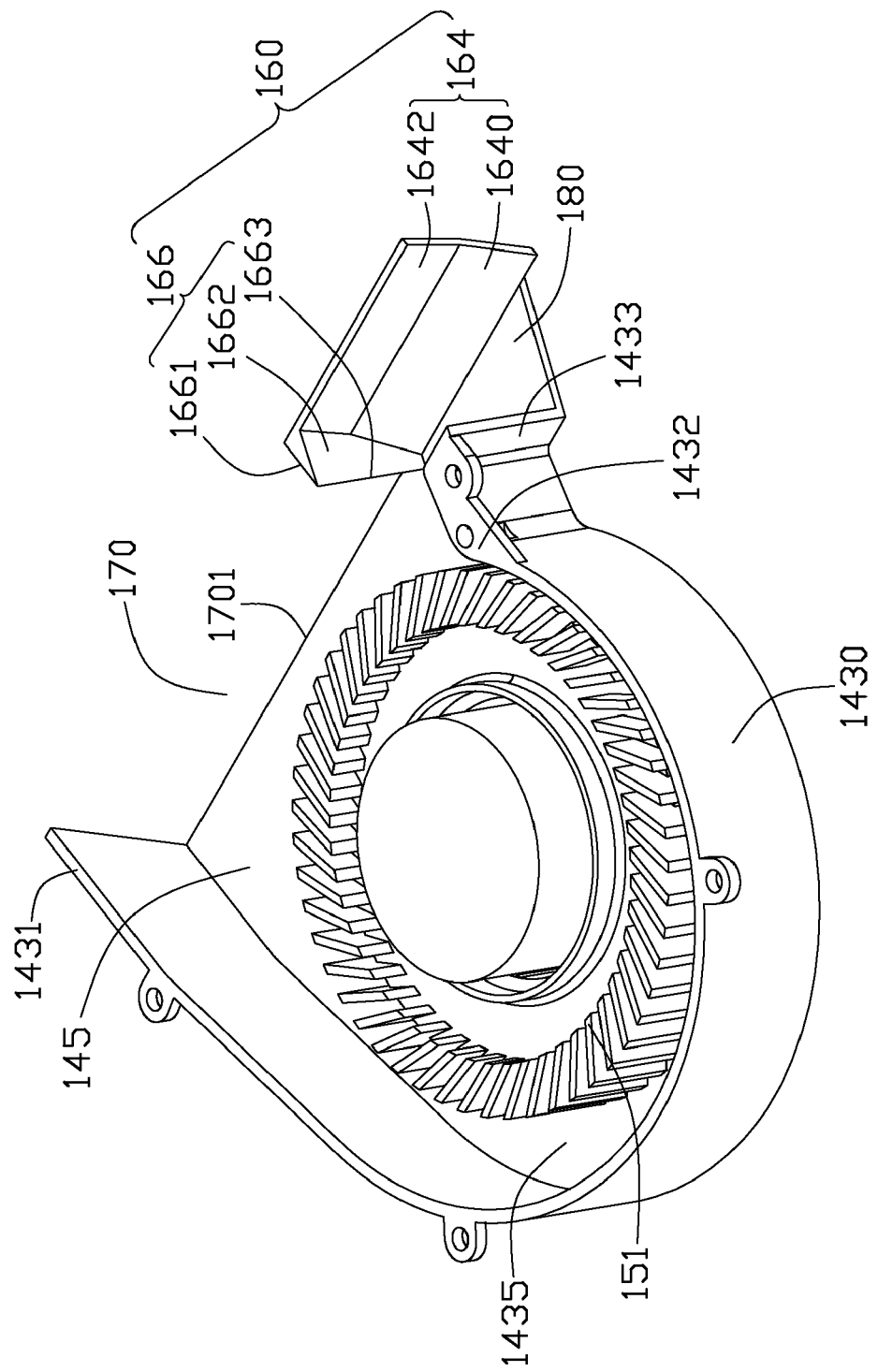
FIG. 3 is an isometric, assembled centrifugal fan of the heat dissipation device of FIG. 2 viewed from a bottom aspect, with a bottom wall thereof omitted for purposes of illustration.

The centrifugal fan 14 includes a housing 140 and an impeller 150 rotatably disposed in the housing 140. Referring to FIGS. 2 and 3, the housing 140 includes a bottom wall 142 and a top cover 144 mounted on the bottom wall 142. The bottom wall 142 is plate-shaped, which defines a through hole 147 at a center thereof functioning as an air inlet for the centrifugal fan 14. The top cover 144 includes a flat top wall 141 and a volute sidewall 143 around the impeller 150. The top wall 141 defines a through hole 146 at a center thereof, corresponding to the through hole 147 of the bottom wall 142 and functioning as another air inlet for the centrifugal fan 14. The sidewall 143 extends downwardly and perpendicularly from an outer periphery of the top wall 141 to the bottom wall 142. The top wall 141, the sidewall 143 and the bottom wall 142 cooperatively define a receiving space 145 in the housing 140 for receiving the impeller 150 therein. The impeller 150 includes a plurality of blades 151. A supporting base 148 is formed on a centre of the through hole 147 of the bottom wall 142 for supporting the impeller 150 thereon.

Figure 4:
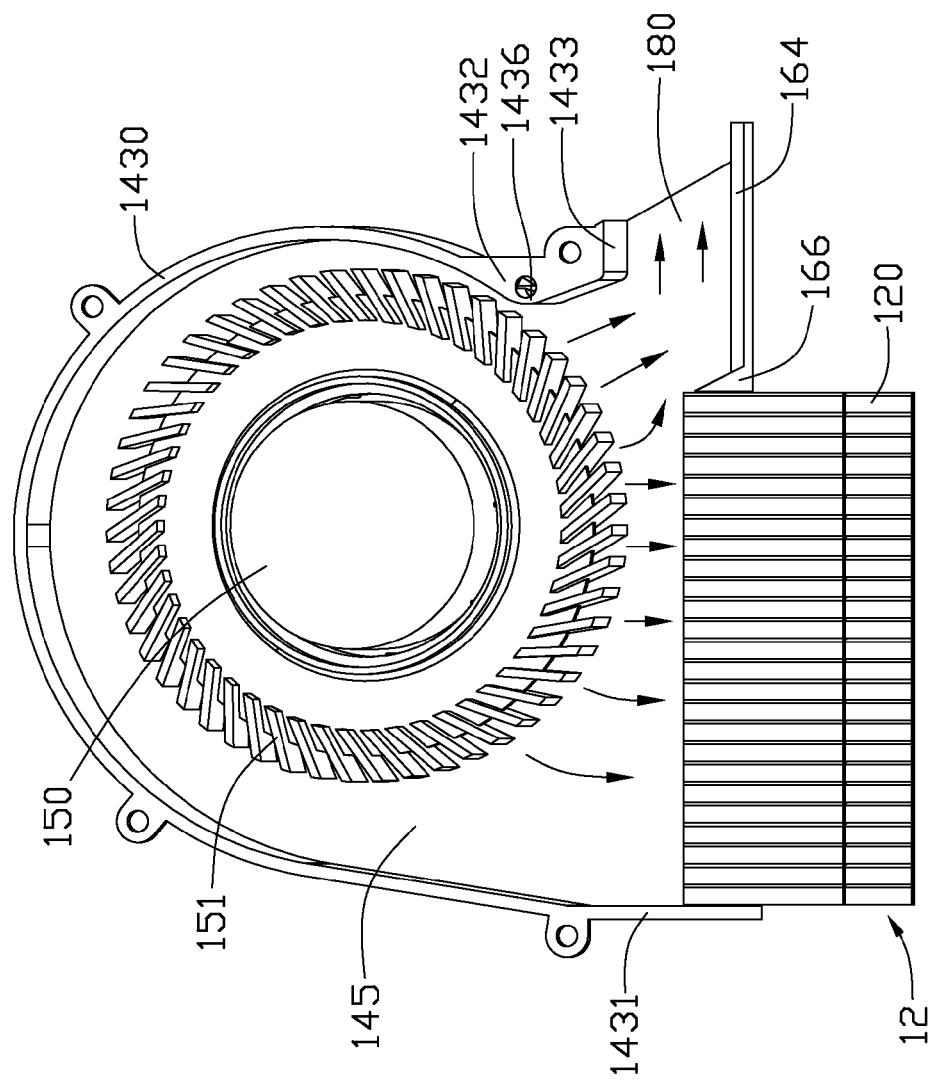
FIG. 4 is a top view of the centrifugal fan of FIG. 3.

The sidewall 143 is a semi-closed structure. The sidewall 143 includes an arced portion 1430, a linear portion 1431 extending linearly from one end (a left end in FIGS. 3-4) of the arced portion 1430 and a plate-shaped portion 1433 extending outwardly and perpendicularly from another end (a right end in FIGS. 3-4) of the arced portion 1430. Referring to FIG. 4 together, an air channel 1435 is formed between free ends of the blades 151 and an inner surface of the sidewall 143 of the top cover 144. A width of the air channel 1435 is gradually increased along an anti-clockwise direction as viewed from FIG. 4 so as to increase the pressure of the airflow wherein the blades 151 rotate anti-clockwise. A tongue 1432 is formed at the arced portion 1430 of the sidewall 143 adjacent to the plate-shaped portion 1433. The tongue 1432 has a convex side surface which faces an interior of the housing 140 and protrudes inwardly from an inner surface of the arced portion 1430 towards the free ends of the blades 151. A crested bulge 1436 is formed on an inner end of side surface of the tongue 1432. A distance between the side surface of the tongue 1432 and the free ends of the blades 151 gradually increases from the bulge 1436 towards an out end of the side surface of the tongue 1432 that is adjacent to the plate-shaped portion 1433 of the sidewall 143. The sidewall 143 defines a first air outlet 170 and a second air outlet 180 adjacent to the first air outlet 170. The first air outlet 170 is adjacent to the linear portion 1431 of the sidewall 143, and the second air outlet 180 is adjacent to the plate-shaped portion 1433 of the sidewall 143.

An air guiding mechanism 160 is formed on the outer periphery of the top wall 141 adjacent to the plate-shaped portion 1433. The air guiding mechanism 160 includes an air guiding wall 164 facing and spaced from the plate-shaped portion 1433 of the sidewall 143 and an air partition wall 166 extending perpendicularly and inwardly from one end of the air guiding wall 164 near the first air outlet 170 towards the blades 151. The first air outlet 170 is defined between the linear portion 1431 of the sidewall 143 and the air partition wall 166. The second air outlet 180 is perpendicular to the first air outlet 170 and is defined between the plate-shaped portion 1433 of the sidewall 143 and the air guiding wall 164. The air guiding wall 164 includes an inclined plate 1640 extending downwardly and outwardly from the top wall 141 and a vertical plate 1642 extending downwardly and vertically from a bottom end of the inclined plate 1640. A distance between the inclined plate 1640 and the plate-shaped portion 1433 gradually increases along a top-to-bottom direction. Whilst, a distance between the vertical plate 1642 and the plate-shaped portion 1433 is constant in the top-to-bottom direction, and equals to a maximal distance between the plate portion 1433 and the inclined plate 1640. That is, the second air outlet 180 has a larger volume, compared with the situation when the air guiding wall 164 is extended entirely perpendicularly from the outer periphery of the top wall 141.

The air partition wall 166 has a shape of a triangular frustum pyramid, which has a triangular cross section as viewed from top or bottom of the centrifugal fan 14. The air partition wall 166 includes a first lateral side 1661 facing the first air outlet 170 and a confronting second lateral side 1662 facing the second air outlet 180. A distance between the first and the second lateral sides 1661, 1662 of the air partition wall 166 decreases gradually from an outer end which connects to the air guiding wall 164 towards an inner end which is adjacent to the blades 151. The first and the second lateral sides 1661, 1662 of the air partition wall 166 intersect at a side edge 1663 at the inner end. The side edge 1663 is perpendicular to the top wall 141. The first lateral side 1661 is substantially parallel to the linear portion 1431 of the sidewall 143 and perpendicular to the air guiding wall 164. The second lateral side 1662 is inclined to the air guiding wall 164 and thus forms an obtuse angle therebetween. The air guiding mechanism 160 and the top wall 141 of the top cover 144 are integrally formed by injection molding process as a single piece. Alternatively, the air guiding mechanism 160 and the top wall 141 of the top cover 144 can be molded separately and then be joined together.

The fin unit 12 is arranged at the first air outlet 170. The fin unit 12 includes a plurality of fins 121 arranged side by side. An airflow channel 120 is defined between each two neighboring fins 121. Outmost fins 121 which are arranged at two opposite sides of the fin unit 12 abut against the linear portion 1431 of the sidewall 143 and the first lateral side 1661 of the air partition wall 166, respectively.

Referring back to FIG. 1, the heat dissipation device 10 is adjacent to the primary and the secondary electronic components 30, 40 of the electronic device 20. The fin unit 12 is received in the first air outlet 170 of the centrifugal fan 14 and located at a lateral side of the electronic device 20. One end (i.e., an evaporator) of the heat pipe 16 is thermally attached to the primary electronic component 30, and another end (i.e., a condenser) of the heat pipe 16 is thermally connected to the fin unit 12. The second air outlet 180 of the centrifugal fan 14 faces the secondary electronic component 40.

During operation of the electronic device 20, the primary electronic component 30 and the secondary electronic component 40 operate rapidly to thus generate a large amount of heat. The impeller 150 of the centrifugal fan 14 highly rotates to suck cooling air into the interior of the housing 140 through the air inlet of the top wall 141 and the air inlet of the bottom wall 142 simultaneously, and create cooling airflow discharged through the first air outlet 170 and the second air outlet 180, respectively. The heat pipe 16 absorbs heat from the primary electronic component 30 and transfers the heat to the fin unit 12. Due to the air guiding mechanism 160 formed between the first air outlet 170 and the second air outlet 180, a part of the cooling airflow is blown into the airflow channels 120 of the fin unit 12 through the first air outlet 170 to take heat there away, and another part of the cooling airflow is guided by the air guiding mechanism 160 into the second air outlet 180 and towards the secondary electronic component 40. The heat spread on the fins 121 is carried away by the part of the cooling airflow and is further radiated to outside of the electronic device 20. The another part of the cooling airflow flows towards the secondary electronic component 40 for taking heat therefrom and further is blown into the interior of housing 140 for lowering an interior temperature of the electronic device 20.

A flow direction of the airflow flowing towards the first air outlet 170 is substantially parallel to the first air outlet 170 as indicated by arrows in FIG. 4, whilst the airflow flowing towards the second air outlet 180 forms an angle with the second air outlet 180. Since the air partition wall 166 has a minimum thickness at the side edge 1663 which is adjacent to the free ends of the blades 151 and the side surface of the tongue 1432 inclined outward toward the plate-shaped portion 1433, a wide air entrance is defined between the inner end of the air partition wall 166 and the side surface of the tongue 1432 for more cooling air easily flow into the second air outlet 180 therefrom. Since the second lateral side 1662 of the air partition wall 166 forms the obtuse angle with the air guiding wall 164, cooling air flowing into the second air outlet 180 can be smoothly guided by the second lateral side 1662 of the air partition wall 166 and then by the air guiding wall 164 towards the secondary electronic component 40.

Thus, the first and second air outlets 170, 180 are independent of each other as to heat dissipation, and the heat generated by the primary and secondary electronic components 30, 40 can be dissipated respectively by the first and second air outlets 170, 180. If the primary electronic component 30 generates a much lager mount of heat than the secondary electronic component 40, the heat of the primary electronic component 30 will not be transferred from the fin unit 12 back to the secondary electronic component 40 through the heat pipe 16 since the secondary electronic component 40 does not have a thermal connection with the fin unit 12 and the heat pipe 16. The heat from the first electronic component 30 may cause damage to the secondary electronic component 40 due to a too high temperature, if the heat is transferred to the secondary electronic component 40.

It is to be understood, however, that even though numerous characteristics and advantages of the disclosure have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A centrifugal fan comprising:
   a plurality of blades;
   a housing for receiving the blades therein, the housing comprising a top wall and a sidewall around the top wall, the sidewall defining a first air outlet and a second air outlet adjacent to the first air outlet; and
   an air guiding mechanism being located between the first air outlet and the second air outlet, the air guiding mechanism comprising an air guiding wall perpendicular to a flowing direction of an airflow generated by the blades flowing through the first air outlet and an air partition wall extending inwardly from the air guiding wall towards the blades, the first air outlet being defined between the air partition wall and the sidewall, the second air outlet being defined between the air guiding wall and the sidewall, the second air outlet being perpendicular to the first air outlet.

2. The centrifugal fan as described in claim 1, wherein the sidewall comprises an arced portion, a linear portion extending linearly and smoothly from one end of the sidewall and a plate-shaped portion extending outwardly from an opposite end of the sidewall, the first air outlet being defined between the linear portion of sidewall and the air partition wall, the second air outlet being defined between the plate-shaped portion of the sidewall and the air guiding wall.

3. The centrifugal fan as described in claim 2, wherein the air partition wall comprises a first lateral side facing the first air outlet and a second lateral side facing the second air outlet, a distance between a surface of the first lateral side and a surface of the second lateral side increasing from an inner end which is adjacent to the blades towards an outer end which is connected to the air guiding wall.

4. The centrifugal fan as described in claim 3, wherein the first lateral side and the second lateral side intersect at a side edge at the inner end of the air partition wall.

5. The centrifugal fan as described in claim 3, wherein the first lateral surface is perpendicular to the air guiding wall, and the second lateral surface forms an obtuse angle with the air guiding wall.

6. The centrifugal fan as described in claim 2, wherein the air guiding wall comprises an inclined plate extending downwardly and outwardly from an outer periphery of the top wall and a vertical plate extending downwardly and perpendicularly from a bottom end of the inclined plate, the vertical plate being perpendicular to the top wall.

7. A heat dissipation device comprising:
a centrifugal fan comprising:
a plurality of blades;
a housing receiving the blades therein, the housing comprising a top wall and a sidewall around the top wall, the sidewall defining a first air outlet and a second air outlet adjacent to the first air outlet; and
an air guiding mechanism being located between the first air outlet and the second air outlet, the air guiding mechanism comprising an air guiding wall perpendicular to a flowing direction of an airflow generated by the blades flowing through the first air outlet and an air partition wall extending inwardly from the air guiding wall towards the blades, the first air outlet being defined between the air partition wall and the sidewall, the second air outlet being defined between the air guiding wall and the sidewall, the second air outlet being perpendicular to the first air outlet and facing an electronic component; and
a fin unit arranged at the first air outlet.

8. The heat dissipation device as described in claim 7, wherein the sidewall comprising an arced portion, a linear portion extending linearly and smoothly from one end of the sidewall and a plate-shaped portion extending outwardly from an opposite end of the sidewall, the first air outlet being defined between the linear portion of sidewall and the air partition wall, the second air outlet being defined between the plate-shaped portion of the sidewall and the air guiding wall.

9. The heat dissipation device as described in claim 8, wherein the air guiding wall comprises an inclined plate extending downwardly and outwardly from an outer periphery of the of the top wall and a vertical plate extending downwardly and perpendicularly from a bottom end of the inclined plate, a distance between the plate-shaped portion of the sidewall and the inclined plate increases along an axial direction of the centrifugal fan, and a distance between the plate portion of the sidewall and the vertical plate is constant.

10. The heat dissipation device as described in claim 8, wherein the air partition wall comprises a first lateral side facing the first air outlet and a second lateral side facing the second air outlet, a distance between a surface of the first lateral side and a surface of the second lateral side increasing from an inner end which is adjacent to the blades towards an outer end which is connected to the air guiding wall.

11. The heat dissipation device as described in claim 10, wherein outmost fins which are arranged at two opposite sides of the fin unit abut against the linear portion of the sidewall and the first lateral side of the air partition wall, respectively.

12. The heat dissipation device as claimed in claim 7, further comprising a heat pipe having an evaporator thermally connecting with the fin unit and a condenser for thermally connecting with another electronic component, which generates more heat than that generated by the electronic component when the electronic component and the another electronic component are under operation.

13. The heat dissipation device as claimed in claim 12, wherein the another electronic component is a CPU (central processing unit) and the electronic component is a GPU (graphics processing unit).

* * * * *